United States Patent Office 3,723,235
Patented Mar. 27, 1973

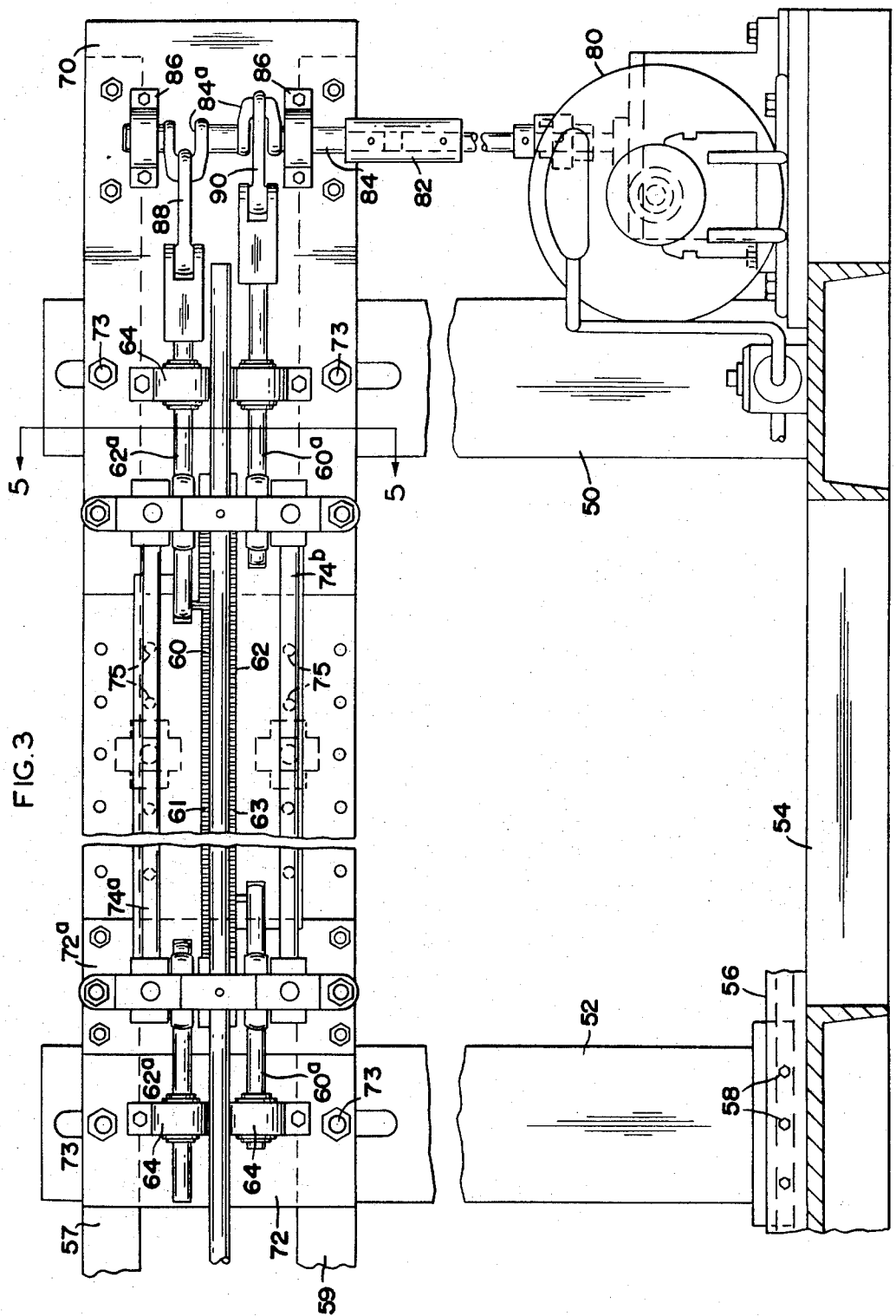

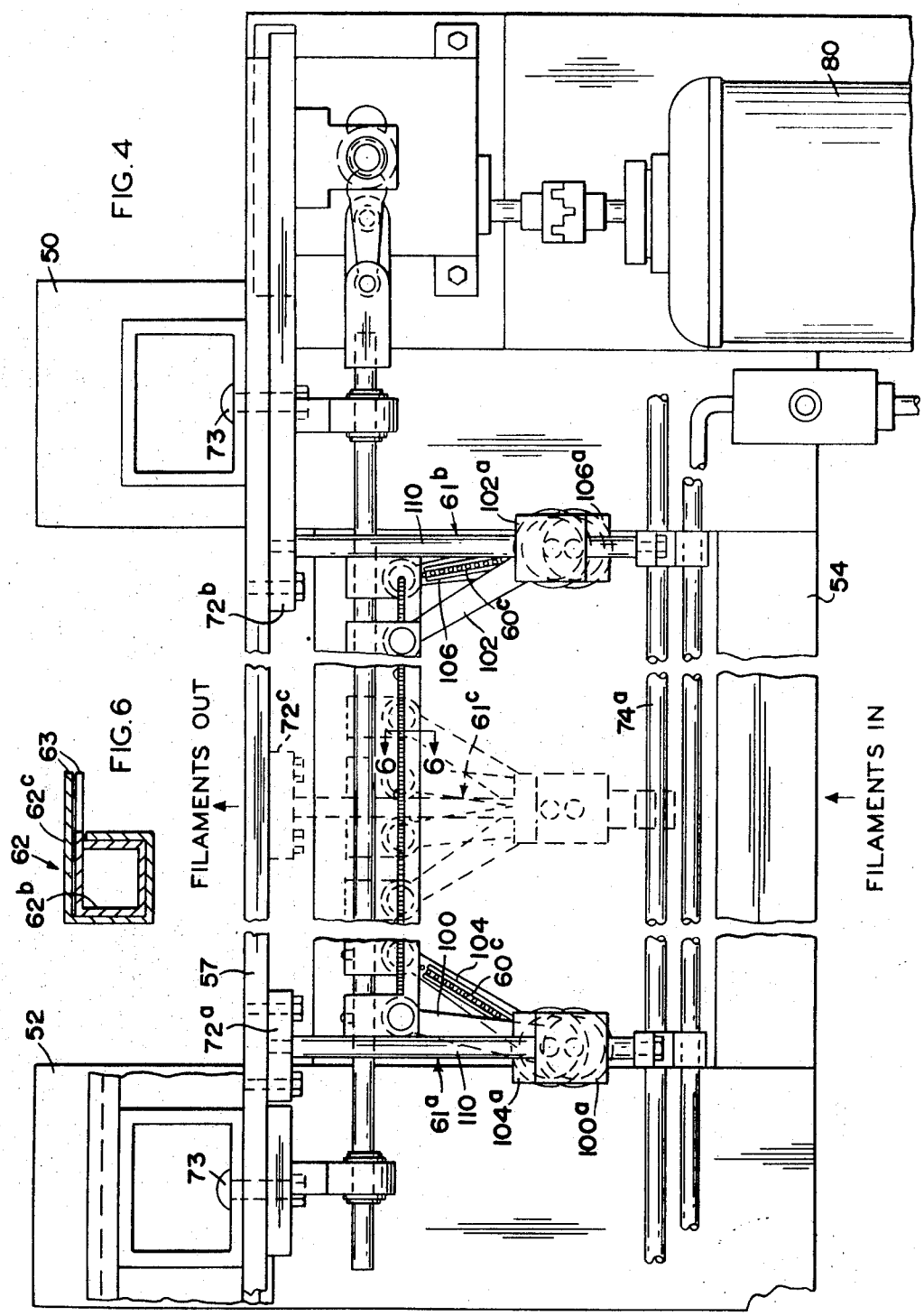

3,723,235
REINFORCED SHEET MATERIAL AND METHOD FOR MAKING THE SAME
Edward T. Armstrong, 490 Pepperidge Tree Terrace, Butler, N.J. 07405
Continuation-in-part of application Ser. No. 673,164, Oct. 5, 1967, now Patent No. 3,549,455. This application Dec. 21, 1970, Ser. No. 100,238
Int. Cl. B32b 3/02; D04h 3/12
U.S. Cl. 161—140
13 Claims

ABSTRACT OF THE DISCLOSURE

Disclosed is a reinforced sheet material or scrim which consists of filaments extending in wave forms along the material. The filaments preferably extend in overlapping paths along certain portions of the material and along paths of progressively decreasing amplitude on either side of the uniform portion, but with about the same frequency as in the uniform portion, towards the edges of the material, slitting points between adjacent uniform portions, or lap reinforcements. The scrim material may be self-reinforced and may also include linear extending filaments and/or laminated substrates.

---

This application is a continuation-in-part of application Ser. No. 673,164, filed Oct. 5, 1967, now Pat. No. 3,549,455 issued on Dec. 22, 1970.

In the methods utilized heretofore in the making of scrim and/or scrim reinforced sheet material, the filaments or yarns have been deposited in a uniform manner across the width of the material with a large selvage edge on each side of the sheet. With the methods of the prior art it is not possible to control the product strength across the width of the sheet to make it uniform, or progressively increasing or decreasing at the edges or at intermediate slitting points. Thus, for example, it is not possible with the prior methods to make a sheet of scrim or scrim reinforced material which can be slit into narrower sheets each of which is fully reinforced along both of its lateral edges.

It is the primary object of the present invention to provide an improved method for making scrim or scrim reinforced sheet materials in which the product strength may be varied as desired across the width of the material without waste of yarn or filament.

It is also an object of the preesnt invention to provide scrim and/or a scrim reinforced sheet material which may be reinforced along its lateral edges and, if desired, along additional lines between the lateral edges.

A further object of the invention is the provision of scrim or a scrim reinforced sheet material and to a method of making the same in which the material may be manufactured in a width usable without waste and unslit or which is subsequently slit into narrower widths of material each of which is reinforced along both of its lateral edges.

As will become apparent in the following detailed description of the invention, the above objects are achieved by providing scrim material in which the yarns or filaments extend along wave form paths along the length of the material. Preferably, all of the filaments extend along paths of the same frequency but a decreasing amplitude toward the edges or other points of reinforcement of the sheet. One portion of the filaments may be deposited in an out of phase relation to the other portion of the filaments so that a crisscrossing or overlapping of the filaments is achieved to provide greater strength to the material.

For a more complete understanding of the invention and of the objects and advantages thereof reference should be had to the following specification and the accompanying drawings wherein there is shown a preferred embodiment of the invention.

In the drawings:

FIG. 3 is a partially broken away, elevational view of the cones and drive mechanism incorporated in one form of the apparatus used to accomplish the methods of the present invention;

FIG. 4 is a partially broken away, end elevation of the apparatus of FIG. 3 showing in greater detail the specific arrangement between the main cones and the auxiliary cones;

FIG. 6 is an enlarged cross-sectional illustration of the telescoping arrangement of the main combs taken on the line 6—6 of FIG. 4;

FIG. 7 is a plan view of the apparatus showing how the main combs are fed from beams and the auxiliary combs are fed from pirns; and FIG. 8 is an enlarged broken-away plan view of one form of the reinforced material made according to the methods of the present invention.

Figure 1:
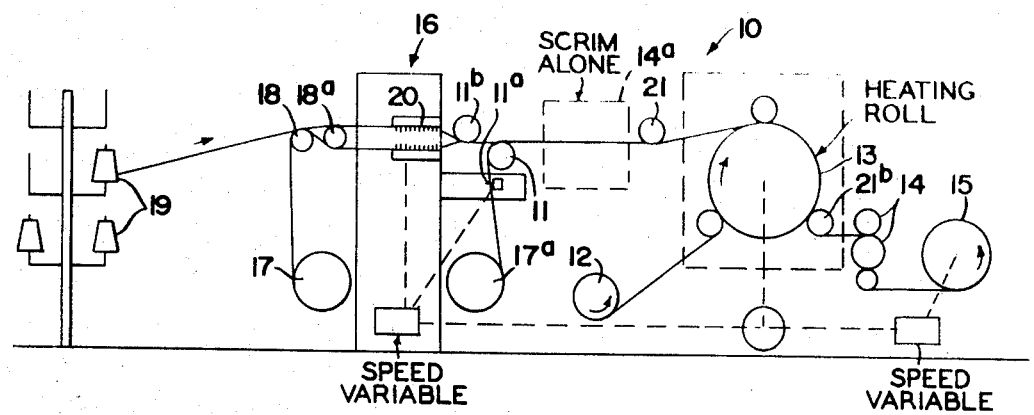
FIG. 1 is a side schematic illustration of the overall apparatus utilized to make reinforced sheets in laminated condition.

Reference should first be had to FIG. 8 where a piece of scrim material 1 is illustrated. As is shown in this figure, the material may have regions A extending along its length which are formed of filaments 2 and 3 which extend in a sinusoidal manner along the length of the material with the paths of the filaments 2 and 3 being of equal amplitude and wave length and 180° out of phase with one another to provide an overlapping pattern. The material may also have regions B on either side of the uniform region A. In these regions B the filaments 4 and 5 are again in sinusoidal patterns having the same wave length as the filaments of the region A, but of gradually decreasing amplitude as the distance from the uniform region A increases. The count of filaments across the width of material may also vary, preferably increasing at the outer limits of the areas B to provide reinforcing along the sides of these areas. Thus, the filaments 4 and 5 form a reinforced edge 6 for the sheet. Also, the adjacent edges of contiguous B areas may form a line of reinforcing 7 along the material. This reinforcing line 7 may serve either as a reinforcement of the sheet or as a slitting line along which the sheet 1 may be slit into separate narrower sheets each of which is reinforced along both of its lateral edges by the closely spaced small amplitude filaments of the outer edges of the regions B. The sheet 1 may also have a warp which consists of filaments 8 extending lengthwise along the sheet. These filaments may extend linearly or along paths of high wave length, but small amplitude.

It should be understood that while the material shown in FIG. 8 is provided with two uniform regions A, only one such region may be present or the number of such uniform regions may be varied. Likewise, the widths of the regions A and B may also be varied.

It should also be understood that the scrim of the invention can be produced by omitting one or more of the basic elements, i.e. on of the two filling (sinusoidal wave forms) or the warp, or the warp and a filling. Further, the scrim can be produced with any substrate or substrates. The basic scrim may be self substrate adhered without adhesive by heat and pressure. The scrim may be formed in these various configurations by holding one or more of the drive elements of the apparatus defined more fully hereinafter, i.e. for wave form fill, warp, or selvage edge, inoperative during production. These variations in scrim configuration and structural makeup cover the operation problems of the drive, start up and shut down sequences of the apparatus. It should also be clearly understood that each filament of each group might also be comprised of a plurality of individual filaments, such as a thread of yarn is made up of a plurality of individual fibers.

The filaments 2 through 5 as well as the warp reinforcement 8 may be yarn or roving of nylon, polyester, fiber glass, cotton, rayon, or any other suitable material. When an unlaminated scrim is to be manufactured a suitable bonding adhesive, or the like, is applied to the filaments 2 through 5 and the warp 8. Such a binder may be any suitable solution, emulsion, organosol, or plastisol adhesive or thermo-setting type material. In the manufacture of a laminated scrim reinforced material the filaments, with the warp 8, if desired, in the pattern as shown in FIG. 8 may be laminated to a suitable substrate. This substrate may be of any suitable material including flat or patterned elastomeric, cellulosic, polymeric, fabric, glass, or metallic, or the like, any of which may be in solid, expanded, foam, filament oriented, or randomly disposed forms. Additional layers may also be laminated to the reinforced material, as desired.

One form of apparatus suitable for performing the methods of the present invention and manufacturing the scrim or reinforced material of the invention is shown and described in my above mentioned U.S. Pat. No. 3,549,455. This apparatus is illustrated in FIGS. 1 through 6 and will now be described in sufficient detail to illustrate a scrim or reinforcing material forming methods of the present invention. For a more detailed description of the apparatus reference should be had to my above-mentioned patent.

With reference to the apparatus illustrated in the drawings and particularly to the general overall schematic of FIG. 1, numeral 10 designates the apparatus as a whole and comprises a film or other sheet materials supply roll 12 which supplies the sheet which acts as a substrate, an associated lay-on roll 13, a pair of laminating rolls 14, a take-up roll 15, and the filament handling mechanism indicated generally by reference numeral 16 and described in more detail below. A set of filament carrying pirns, spools, or beams 17 feed the filaments into the mechanism 16 over a guide roll 18 and splitting roll 18a for the main combs (not shown in FIG. 1) while a plurality of yarn carrying pirns 19 feed into the mechanism 16 to auxiliary combs 20.

In some instances it may be desirable to have a warp reinforcement, and to this end a roll 17a feeds the warp reinforcing strands over a directing roll 11, through a comb 11a, and then into proper relation with the scrim received out of the mechanism 16 by the rolls 11b. The comb 11a may be fixed to feed a straight warp or it may be reciprocated with a small amplitude, long wave length oscillation with articulated combs of substantially the same construction as for the mechanism 16, all of which is described more fully below.

Figure 2:
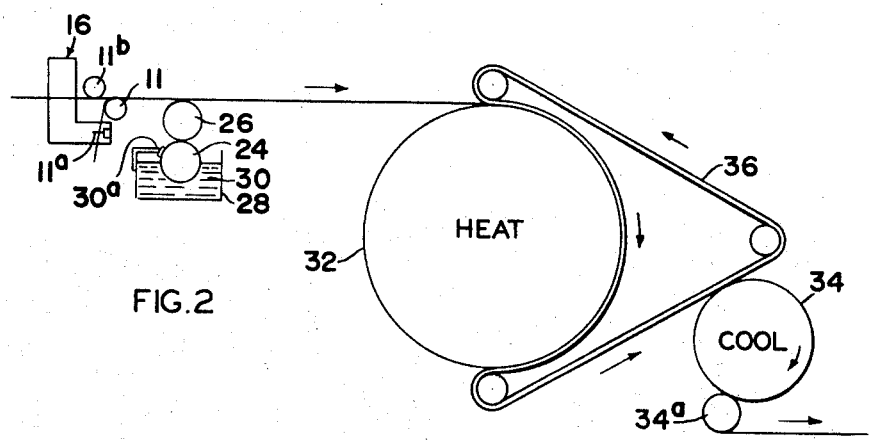
FIG. 2 is a schematic enlarged illustration showing how scrim of reinforced material without any lamination can be made.
Figure 5:
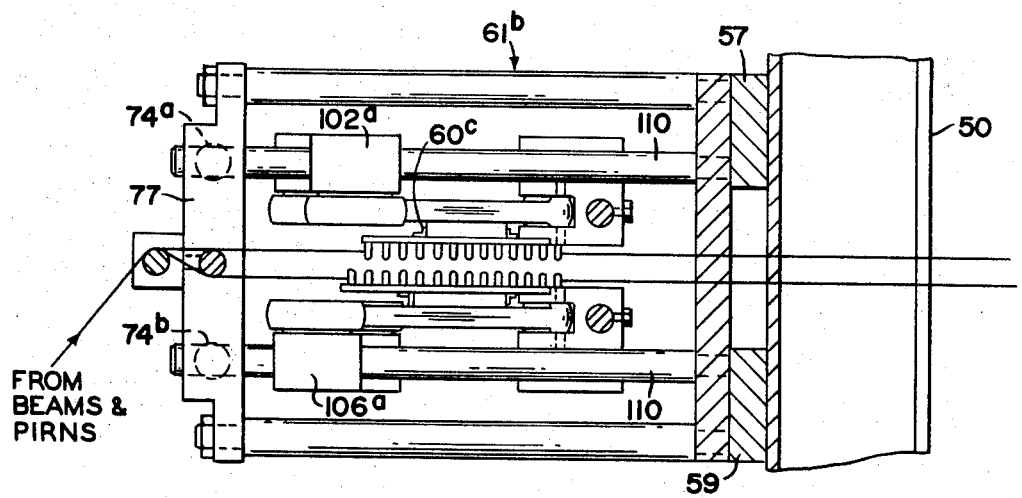
FIG. 5 is an enlarged, vertical, cross-sectional illustration showing the sliding relationship of the auxiliary cones in transverse direction to the sliding relationshp of the main cones as taken on lines 5—5 of FIG. 3.

The invention contemplates that adhesive or binder material may be applied directly after the warp is introduced as indicated by dotted block 14a. The working components of block 14a are shown in FIG. 2 and will be more fully explained hereinafter. Alternatively, according to the desired end product, a web may be introduced from roll 12 in a processing state charactized by a tacky adhesive surface, or a suitable heat-activated adhesive or binder might be coated on the web from roll 12. Alternatively, an emulsion solution, or plastisol binder may be applied there or directly to the scrim within block 14a as described later. The formed strands or filaments coming through mechanism 16 are called the fill, and may be combined with warp from roll 17a, or may be passed alone under lay-on roller 21 and around drum 13. Since the web from roll 12 also passes around drum 13, the strands or filaments are bonded into position on the adhesively characterized web surface which is then wound onto take-up roll 15. A pick-off roll 21b feeds the web and filament combination to the bite or nip of the laminating rolls 14 before it is led to the take-off roll 15. The bite described is unnecessary in certain reinforced substrate composites which have enough stiffness to pay out themselves.

FIG. 2 illustrates the embodiment of the invention modified from that shown in FIG. 1 in which the scrim or reinforced sheet material is formed without the lamination of any sheets thereon. In this instance, the formed filaments or strands coming from mechanism 16 and a warp fill are passed over an adhesive applying roller 26, which contacts an engraved roller 24, whereby roller 24 dips continuously into a tank 28 containing a suitable solution, emulsion, organosol, or plastisol adhesive or thermo-setting type material 30, or the like. A doctor blade 30a in conjunction with the selected mill engraved applicator 30b controls the thickness of the adhesive coating. Independent deposit thickness control may be achieved by speed regulation of roller 26, an offset roll, or the engraved roll 24. Thus, the scrim is coated with the material 30 as it passes over roll 26. The scrim is then passed around a drum 32 which is heated by a suitable means, however, preferably by condensing steam, and from there passes around a cooling roll 34 and a take-off roll 34a before progressing in the direction indicated by the arrows to a suitable take-up roll. In this manner an unlaminated bonded scrim can be manufactured with a tremendous reduction in the amount of adhesive binder required and a marked reduction in the total material required to form the scrim owing to the reduction in waste length scrap and edge trim.

It is preferably for the purposes of the invention that the heating and cooling drums be Teflon covered, and that belt 36 be a permeable Teflon coated belt. Also, with respect to FIG. 2, it should be understood that the applicator roll 26 has provision for speed regulation whereby the quantity deposited is independently controlled by a combination of roll speed and setting of the blade 30a, in conjunction with a selected mill engraving applicator roll 24.

The filament handling mechanism 16 is illustrated in FIGS. 3 through 6. The mechanism is provided with a base frame 54 which mounts stanchions 50 and 52. The stanchions 50 and 52 mount horizontal support rails 57 and 59 which extend transversely of the path of travel of the filaments and the scrim material. Upper and lower main combs 60 and 62, respectively are carried by appropriate rods 60a and 62a which are slidably received in bearing housings 64 supported on the rails 57 and 59 and caused to reciprocate in opposed fashion by crank shaft 84.

It should be understood that the combs 60 and 62 each contain opposed substantially vertically directed teeth, or similar means 61 and 63, respectively, through which the filaments for yarns pass during the formation of the scrim or reinforced sheet material, all in the usual manner of the scrim forming art.

Associated with each of the main combs 60 and 62 are one or more auxiliary combs 100 through 106 which are pivotally connected at one end to the associated frame carrying the main comb and at their opposite ends to blocks 100a through 106a which are slidable along rods 110 which extend transversely of the main comb carrying rods 60a and 62a. As is described in more detail in the above-mentioned patent the number and location of auxiliary combs may be changed as desired, depending upon the number of regions of filaments in decreasing amplitude desired in the formed scrim or reinforcing material.

The mounting arrangement of the auxiliary combs causes these combs to move within a hyperbolic envelope with the movement of the corresponding main combs. Thus, the end of the auxiliary combs closest to the main comb moves at substantially the same amount as does the main comb while the opposite ends of the auxiliary comb oscillate only a small distance across the width of the material.

It will thus be seen that the apparatus described above is capable of performing the scrim or reinforcing material forming methods of the present invention. The yarns or filaments which pass through the main combs 60 and 62 are deposited in wave form paths due to the uniform oscillations of the main combs. The filaments or yarns passing through the auxiliary combs 100 through 106 will be deposited in the paths of the regions B with the filaments passing through the ends of the combs closest to the main combs being deposited along paths of substantially the same amplitude as that of the path of region A and the filaments carried on increasingly further removed portions of the auxiliary combs deposited along paths of decreasing amplitude. The drive arrangement of the auxiliary combs 100 through 106 assures that the filaments carried by these combs are deposited in paths of the same wave lengths as those filaments deposited from the main combs. It will be understood that the count of filaments carried by each of the combs across the width of the material may be varied to vary the count of the filaments deposited onto the scrim reinforcing material. As is described in more detail in the above-mentioned patent, the spacing of the columns may be adjustable to facilitate this varying of the count of the filaments.

It should be understood that the invention is not limited to the specific embodiments described but that changes and/or additions may be made therein. Reference should therefore be had to the appended claims in determining the scope of the invention.

What is claimed is:

1. A reinforced sheet material, comprising:
   a first group of filaments extending the length of the material in a waveform path of uniform amplitude and frequency;
   a second group of filaments extending the length of the material in a waveform path of the same amplitude and frequency as the first group, the second group of filaments overlying the first group of filaments in an out-of-phase relationship thereto;
   a third group of filaments extending the length of the material on each side of the first and second groups, the filaments of the third group being in waveform paths of the same frequency and phase relation as the first group of filaments and of amplitudes which decrease with increased distance from the filaments of the first group;
   a fourth group of filaments extending the length of the material in waveform paths of the same amplitude and frequency as the filaments of the third group and in the same phase relation as the filaments of the second group, the filaments of the fourth group overlying the filaments of the third group; and
   means bonding the filaments together at their points of intersection.

2. Reinforced sheet material according to claim 1 wherein filament density is constant across the first and second groups and increasing toward the regions of lower amplitude in the third and fourth groups.

3. Reinforced sheet material according to claim 1 further including at least two additional groups of filaments each extending the length of the material, the first additional group being located between the lateral edges of the first group of filaments and dividing the first group of filaments into two groups, the filaments of the first additional group following waveform paths of the same frequency and phase as those of the first group and of amplitudes which decrease with increased distance from the first group, the second additional group overlying the first additional group and following wave form paths of the same amplitude and frequency as the first additional group and in the same phase as the second group of filaments.

4. Reinforced sheet material according to claim 3 wherein filament density is constant in the regions of uniform amplitude and increasing in the remaining regions as amplitude decreases.

5. A reinforced sheet material according to claim 1 which includes at least one additional group of filaments extending the length of the sheet material as a warp and bonded with the other filaments at all points of intersection therewith.

6. A sheet material according to claim 5 where the filaments of each group of filaments are composed of a plurality of filaments.

7. A material according to claim 6 which includes a web substrate laminated in bonded relation to the groups of filaments.

8. The material according to claim 6 where the filaments are bonded to each other by heat and pressure.

9. The material according to claim 8 which includes a web substrate laminated in bonded relation to the groups of filaments by heat and pressure.

10. A method for forming a reinforced sheet material which comprises the steps of
    depositing a first group of filaments in a waveform path of substantially uniform amplitude and frequency;
    depositing a second group of filaments in a waveform path overlying the first filaments, the second waveform path having the same amplitude and frequency as the first waveform path but being in out-of-phase relation thereto;
    depositing a third group of filaments adjacent each lateral edge of the first group in waveform paths of the same frequency and phase as the first group but of amplitudes which decrease with increased distance from the first group;
    depositing a fourth group of filaments in overlying relation to the third group in waveform paths of the same frequency and phase as the second group and of the same amplitude as the third group; and
    bonding all the filaments at their points of intersection.

11. A method as in claim 10 further including depositing at least two additional groups of filaments in a region between the lateral edges of the first group and dividing the first group into two groups, the first additional group being deposited in waveform paths of the same frequency and phase as the first group and of amplitudes which decrease with increased distance from the first group, the second additional group being deposited in waveform paths of the same frequency and amplitude as the first additional group and of the same phase as the second group.

12. A method according to claim 10 which includes the step of laminating the sheet material to warp filaments that extend longitudinally of the sheet material across substantially the full width thereof.

13. A method according to claim 10 including the step of adding at least one web in laminated relation to the filaments.

References Cited

UNITED STATES PATENTS

| | | | |
|---|---|---|---|
| 2,738,298 | 3/1956 | David et al. | 156—181 X |
| 3,095,338 | 6/1963 | Romanin | 156—181 X |
| 3,314,841 | 4/1967 | Romanin | 156—181 X |
| 3,442,751 | 5/1969 | Langlois | 156—180 X |
| 3,512,230 | 5/1970 | Luzzatto | 156—181 X |
| 3,515,621 | 6/1970 | Watson | 156—181 X |

ROBERT F. BURNETT, Primary Examiner

G. W. MOXON II, Assistant Examiner

U.S. Cl. X.R.

156—177, 178, 181; 161—149, 150